United States Patent
Keyworth et al.

(10) Patent No.: US 9,575,260 B2
(45) Date of Patent: Feb. 21, 2017

(54) WAVELENGTH SELECTIVE SWITCH USING ORTHOGONALLY POLARIZED OPTICAL BEAMS

(71) Applicant: Lumentum Operations LLC, Milpitas, CA (US)

(72) Inventors: Barrie Keyworth, Ontario (CA); Paul Colbourne, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/087,364

(22) Filed: Mar. 31, 2016

(65) Prior Publication Data

US 2016/0282563 A1 Sep. 29, 2016

Related U.S. Application Data

(63) Continuation of application No. 14/230,397, filed on Mar. 31, 2014, now Pat. No. 9,304,257.

(51) Int. Cl.
*G02B 6/32* (2006.01)
*G02B 6/35* (2006.01)
*G02B 6/27* (2006.01)
*G02B 6/293* (2006.01)

(52) U.S. Cl.
CPC .......... *G02B 6/3594* (2013.01); *G02B 6/272* (2013.01); *G02B 6/2766* (2013.01); *G02B 6/29305* (2013.01); *G02B 6/32* (2013.01); *G02B 6/356* (2013.01); *G02B 6/3512* (2013.01); *G02B 6/3514* (2013.01); *G02B 6/3518* (2013.01); *G02B 6/3534* (2013.01); *G02B 6/3546* (2013.01); *G02B 6/3556* (2013.01)

(58) Field of Classification Search
CPC .... G02B 6/356; G02B 6/3512; G02B 6/3556; G02B 6/272; G02B 6/2793; G02B 6/3516; G02B 6/3542; G02B 6/3594; G02B 6/3598; G02B 26/0833
See application file for complete search history.

(56) References Cited

U.S. PATENT DOCUMENTS

| | | |
|---|---|---|
| 6,498,872 B2 | 12/2002 | Bouevitch et al. |
| 6,707,959 B2 | 3/2004 | Ducellier et al. |
| 6,810,169 B2 | 10/2004 | Bouevitch |
| 6,859,573 B2 | 2/2005 | Bouevitch et al. |
| 7,014,326 B2 | 3/2006 | Danagher et al. |
| 7,725,027 B2 | 5/2010 | Keyworth et al. |
| 7,769,255 B2 | 8/2010 | Nagy et al. |
| 8,081,875 B2 | 12/2011 | Keyworth et al. |
| 8,190,025 B2 | 5/2012 | Presley et al. |
| 8,437,634 B2 | 5/2013 | Sakurai |
| 8,644,705 B2 | 2/2014 | Barbarossa et al. |
| 9,304,257 B2 | 4/2016 | Keyworth et al. |

(Continued)

*Primary Examiner* — Thomas A Hollweg
*Assistant Examiner* — Mary A El Shammaa
(74) *Attorney, Agent, or Firm* — Harrity & Harrity, LLP

(57) ABSTRACT

The number of wavelength selective switch (WSS) units in a WSS device can be doubled by using polarization properties of optical beams propagating through the WSS device. Beams from different WSS units are orthogonally polarized at the front end, propagated through collimator, wavelength dispersing element, and a focusing element, and impinge on a polarizing beamsplitter, which directs sub-beams at different polarizations to different directing elements of a director array. A polarization diversity configuration at the back end can be used to reduce polarization dependent loss.

20 Claims, 11 Drawing Sheets

(56) References Cited

U.S. PATENT DOCUMENTS

| | | |
|---|---|---|
| 2004/0033010 A1 | 2/2004 | McGuire |
| 2005/0244098 A1 | 11/2005 | Barrett |
| 2005/0276537 A1 | 12/2005 | Frisken |
| 2006/0067611 A1 | 3/2006 | Frisken et al. |
| 2008/0031627 A1 | 2/2008 | Smith et al. |
| 2009/0220233 A1 | 9/2009 | Presley et al. |
| 2011/0234951 A1 | 9/2011 | Cohen |

WAVELENGTH SELECTIVE SWITCH USING ORTHOGONALLY POLARIZED OPTICAL BEAMS

RELATED APPLICATION

This application is a continuation of U.S. patent application Ser. No. 14/230,397, filed Mar. 31, 2014 (now U.S. Pat. No. 9,304,257), the disclosure of which is incorporated herein by reference.

TECHNICAL FIELD

The present invention relates to optical switching devices, and in particular to wavelength selective optical switches.

BACKGROUND OF THE INVENTION

Wavelength selective switches (WSS) are widely used for dynamic routing wavelength channels in optical communications networks. WSS devices are deployed in optical switching nodes of long-haul, regional, and metro optical communications networks. Referring to FIG. 1A, a typical WSS 100 includes a front end 101 having a single fiber array unit (FAU) 102, containing, for example, one input and four output optical fibers, a concave, usually spherical, mirror 104 to expand and steer an input optical beam 105 emitted by the input fiber of the FAU 102 onto a diffraction grating 106 for wavelength dispersion, further imaging onto a dispersed focal plane 108 containing a MEMS array 110 for selectively steering wavelength channels back through the WSS 100 to the outputs fibers of the FAU 102. Such wavelength-selective switching devices have been disclosed, for example, by Bouevitch et al. in U.S. Pat. No. 6,498,872, and by Ducellier et al. in U.S. Pat. No. 6,707,959. The MEMS array 110 can be replaced by a digital light processor (DLP), liquid crystal (LC), or a liquid-crystal-on-silicon (LCoS) phased array. In the latter two cases, due to polarization sensitivity of the MEMS array 110, the optical beam 105 is split into two orthogonally polarized sub-beams at the front end 101, with one sub-beam being rotated so that the optical sub-beams in a single polarization state are propagated through the WSS 100.

Presently available WSS are highly integrated devices. Keyworth et al. in U.S. Pat. No. 7,725,027 disclose a twin WSS device, in which two WSS share common optical elements. Referring to FIGS. 1B and 1C with further reference to FIG. 1A, a prior-art twin WSS 120 is shown in schematic elevation and plan views, respectively. The twin WSS 120 includes two independently operable WSS units sharing the following common optical elements: a collimator 104-1, the diffraction grating 106, a focusing element 104-2, and the MEMS 110. The collimator 104-1 and the focusing element 104-2 can be replaced by the single spherical mirror 104 of FIG. 1A, resulting in a practical 4$f$ configuration. The 4$f$ configuration for a WSS has been described in detail in the U.S. Pat. No. 6,498,872.

Referring specifically to FIG. 1B, a first WSS unit includes a first front end 101A having a first FAU 102A and a first lens 121A. A light beam 105A is collimated by the collimator 104-1, dispersed into individual wavelength channels 107A (FIG. 1C) by the diffraction grating 106, and is focused by the focusing element 104-2 onto a first row 110A of tiltable micromirrors of the MEMS array 110, which redirect individual wavelength channels 107A to propagate back and couple in a wavelength-selective manner into output fibers of the first FAU 102A. Similarly, a second WSS unit includes a second front end 101B having a second FAU 102B and a second lens 121B. A light beam 105B is collimated by the collimator 104-1, dispersed into individual wavelength channels 107B (FIG. 1C) by the diffraction grating 106, and is focused by the focusing element 104-2 onto a second row 110B of tiltable micromirrors of the MEMS 110, which redirect individual wavelength channels 107B to propagate back and couple in a wavelength-selective manner into output fibers of the second FAU 102B. In the view of FIG. 1C, the wavelength channels 107A and 107B are overlapped.

The twin WSS 120 of FIGS. 1B and 1C is a more economical and space-efficient unit than two single-unit WSS 100 of FIG. 1A. Future networks will require higher-degree network nodes having higher port count, and "colorless" add/drop ports, that is, add/drop ports allowing any wavelength channel to be added or dropped. The twin WSS 120 operates over a single spectral band of communication, either C-band or L-band.

Increasing data throughput in WSS networks has typically been achieved through a combination of increased number of multiplexed wavelengths within the C or L-band, and increased bit rates within each wavelength channel. When combined, these increases lead to improved spectral efficiency within the finite optical bandwidth of the optical amplifiers. However, each subsequent increase requires an improved optical signal-to-noise ratio (OSNR), which typically requires that optical power levels in the fiber are increased. It is anticipated that within the next 5 years, one will reach fundamental limits due to fiber optical nonlinearity, preventing further increases in OSNR. At this point, it is likely that the next path forward would either be C+L band WSS networks, or "spatially multiplexed" networks, consisting of overlayed "planes" of WSS networks. Demand is expected for both solutions, depending on the existing infrastructure of network operators; to support this future demand of compact, economical WSS devices, a more densely packed WSS devices are required.

SUMMARY OF THE INVENTION

According to the invention, the number of WSS units in a WSS device can be doubled by using polarization properties of optical beams propagating through the WSS device. Optical beams at two orthogonal polarizations can be co-propagated in a same WSS device, providing space and cost savings.

In accordance with the invention, there is provided a WSS comprising:

first and second FAUs for launching first and second light beams, respectively, each of the first and second light beams comprising a plurality of wavelength channels, each of the first and second FAUs including a plurality of optical fibers for wavelength selective switching wavelength channels therebetween;

first and second polarizers optically coupled to the first and second FAUs, respectively, for polarizing the first and second light beams;

a first beam combiner optically coupled to the first and second polarizers, for combining the polarized first and second light beams, into a first combined beam, in which the first and second light beams are orthogonally polarized;

a collimator optically coupled to the first beam combiner, for collimating the first combined beam;

a wavelength dispersing element optically coupled to the collimator, for dispersing the first combined beam into a first plurality of wavelength groups, each group comprising one of the wavelength channels from each of the orthogonally polarized first and second light beams;

a focusing element optically coupled to the wavelength dispersing element, for focusing the first plurality of wavelength groups;

a first polarizing beamsplitter optically coupled to the focusing element, for separating each of the first plurality of wavelength groups into first and second wavelength channels corresponding to the first and second orthogonally polarized light beams, respectively; and a director array downstream of the first polarizing beamsplitter, the director array including first and second rows of directors for independently redirecting the first and second wavelength channels, respectively, to propagate back through the first polarizing beamsplitter, the focusing element, the wavelength dispersing element, the collimator, the first beam combiner, the first and second polarizers, respectively, for independent wavelength-selective coupling into selected optical fibers of the first and second FAUs, respectively.

To accommodate more WSS units in one package, the above WSS can also include third and fourth FAU for launching third and fourth light beams, respectively, each of the third and fourth light beams comprising a plurality of wavelength channels, each of the third and fourth FAUs including a plurality of optical fibers for wavelength selective switching wavelength channels therebetween;

third and fourth polarizers optically coupled to the third and fourth FAUs, respectively, for polarizing the third and fourth light beams, respectively;

a second beam combiner optically coupled to the third and fourth polarizers, for combining the polarized third and fourth light beams, respectively, into a second combined beam, in which the third and fourth light beams are orthogonally polarized;

wherein the collimator is optically coupled to the second beam combiner for collimating the second combined beam, so that in operation, the wavelength dispersing element disperses the second combined beam into a second plurality of wavelength groups, each group comprising one of the wavelength channels from each of the orthogonally polarized third and fourth light beams, and wherein the focusing element focuses the second plurality of wavelength groups;

a second polarizing beamsplitter optically coupled to the focusing element, for separating each of the second wavelength groups into third and fourth wavelength channels corresponding to the third and fourth orthogonally polarized light beams, respectively;

wherein the director array further includes third and fourth rows of directors for independently redirecting the third and fourth wavelength channels, respectively, to propagate back through the second polarizing beamsplitter, the focusing element, the wavelength dispersing element, the collimator, the second beam combiner, the third and fourth polarizers, respectively, for independent wavelength-selective coupling into selected optical fibers of the third and fourth FAUs, respectively.

In accordance with the invention, there is further provided a WSS comprising:

a first FAU for launching a combined optical beam comprising a first light beam comprising a plurality of wavelength channels in the C communication band, and a second light beam comprising a plurality of wavelength channels in the L communication band, the first FAU including a plurality of optical fibers for wavelength selective switching wavelength channels therebetween;

a first beam launching assembly optically coupled to the first FAU, including a polarizer for linearly polarizing the first and second light beams, a C/L band beamsplitter optically coupled to the polarizer, for splitting the first and second light beams for propagation adjacent each other while being orthogonally polarized, and polarization rotator for rotating the polarization of the first or second light beams, whereby the first and second light beams are orthogonally polarized;

a collimator optically coupled to the beam launching assembly, for collimating the first and second light beams;

a wavelength dispersing element optically coupled to the collimator, for dispersing the first and second light beams into a first plurality of wavelength groups, each group comprising one of the wavelength channels from each of the orthogonally polarized first and second light beams;

a focusing element optically coupled to the wavelength dispersing element, for focusing the first plurality of wavelength groups;

a first polarizing beamsplitter optically coupled to the focusing element, for separating each of the first wavelength groups into first and second wavelength channels corresponding to the first and second orthogonally polarized light beams, respectively; and a director array downstream of the polarizing beamsplitter, the director array including first and second rows of directors for independently redirecting the first and second wavelength channels, respectively, to propagate back through the first polarizing beamsplitter, the focusing element, the wavelength dispersing element, the collimator, and the first beam launching assembly, for independent wavelength-selective coupling into selected optical fibers of the first FAU.

To accommodate more WSS units in one package, the above WSS can also include a second FAU for launching a combined optical beam comprising a third light beam comprising a plurality of wavelength channels in the C communication band, and a fourth light beam comprising a plurality of wavelength channels in the L communication band, the second FAU including a plurality of optical fibers for wavelength selective switching wavelength channels therebetween;

a second beam launching assembly optically coupled to the second FAU, including a polarizer for linearly polarizing the third and fourth light beams, and a C/L band beamsplitter coupled to the polarizer, for splitting the third and fourth light beams for propagation adjacent each other while being orthogonally polarized, and polarization rotator for rotating the polarization of the third or fourth light beams, whereby the third and fourth light beams are orthogonally polarized;

wherein the collimator is coupled to the second beam launching assembly for collimating the third and fourth light beams, so that in operation, the wavelength dispersing element disperses the third and fourth light beams into a second plurality of wavelength groups, each group comprising one of the wavelength channels from each of the orthogonally polarized third and fourth light beams, and the focusing element focuses the second plurality of wavelength groups;

a second polarizing beamsplitter optically coupled to the focusing element, for separating each of the second plurality of wavelength groups into third and fourth wavelength channels corresponding to the third and fourth orthogonally polarized light beams, respectively;

wherein the director array further includes third and fourth rows of directors for independently redirecting the third and fourth wavelength channels, respectively, to propagate back through the second polarizing beamsplitter, the focusing element, the wavelength dispersing element, the collimator, and the second beam launching assembly, for independent wavelength-selective coupling into selected optical fibers of the second FAU.

In accordance with yet another aspect of the invention, there is further provided a WSS comprising:

an FAU for launching a light beam comprising a plurality of wavelength channels, the FAU including a plurality of optical fibers for wavelength selective switching wavelength channels therebetween;

a collimator coupled to the beam combiner, for collimating the light beam;

a wavelength dispersing element optically coupled to the collimator, for dispersing the light beam into the wavelength channels;

a focusing element optically coupled to the wavelength dispersing element, for focusing the wavelength channels;

a polarizing beamsplitter optically coupled to the focusing element, for separating each of the wavelength channels into first and second sub-beams; and a director array optically coupled to the polarizing beamsplitter, for redirecting the first and second sub-beams of each of the wavelength channels to propagate back through the polarizing beamsplitter, the focusing element, the wavelength dispersing element, and the collimator, for wavelength-selective coupling both the first and second sub-beams of each wavelength channel into a same selected optical fiber of the FAU.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
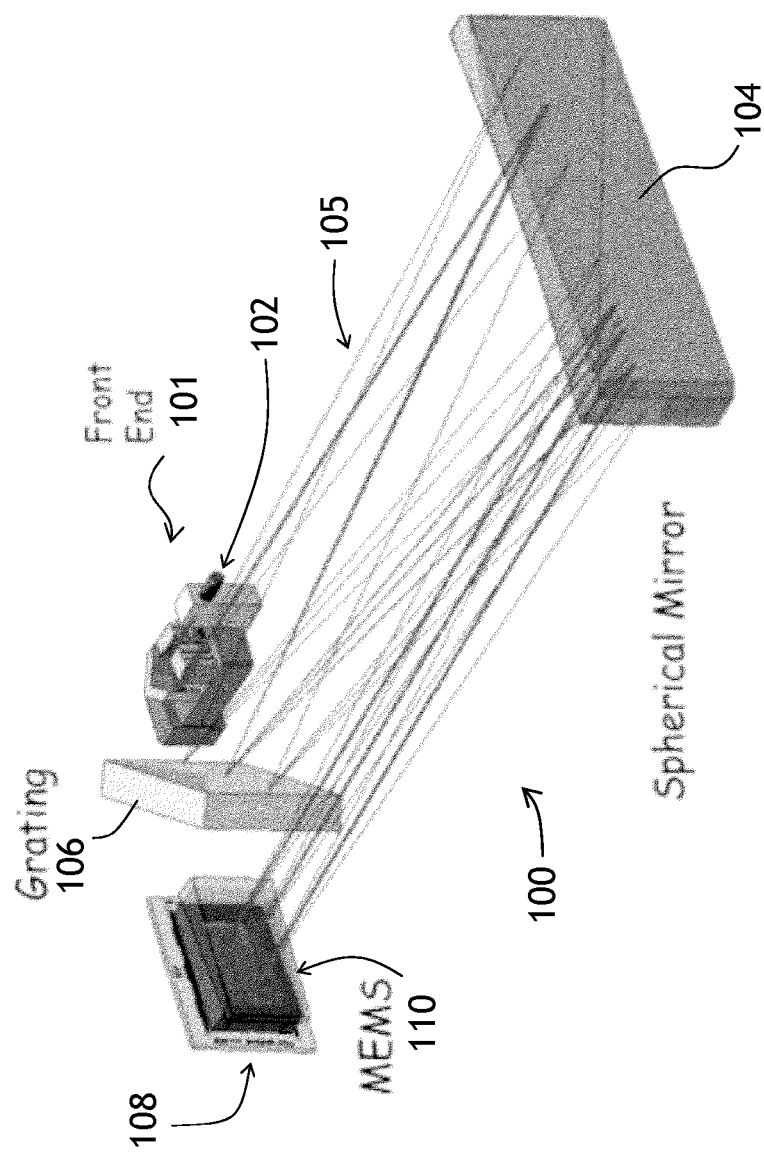
FIG. 1A is an isometric view of a prior-art WSS.
Figure 1B:
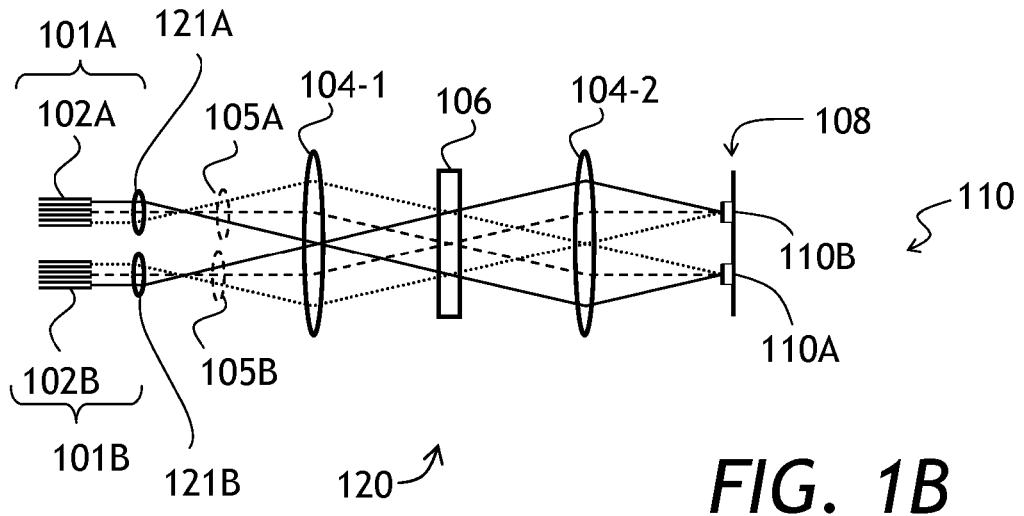
FIGS. 1B and 1C are elevational and plan schematic views, respectively, of a prior-art twin WSS.
Figure 1C:
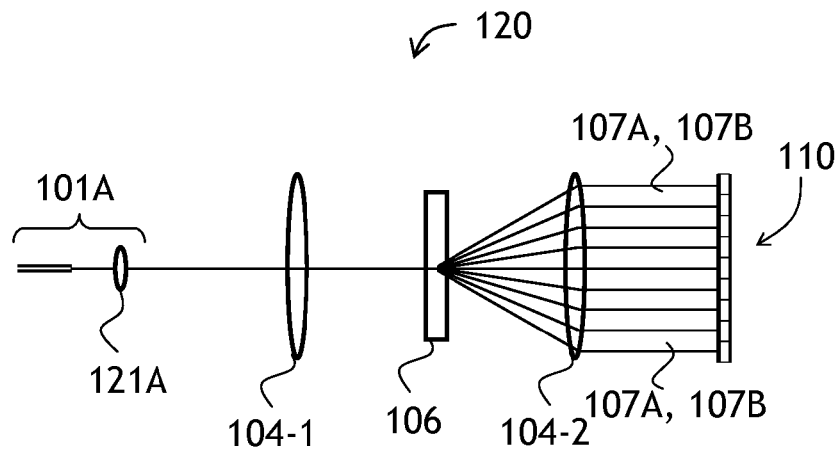
Figure 2A:
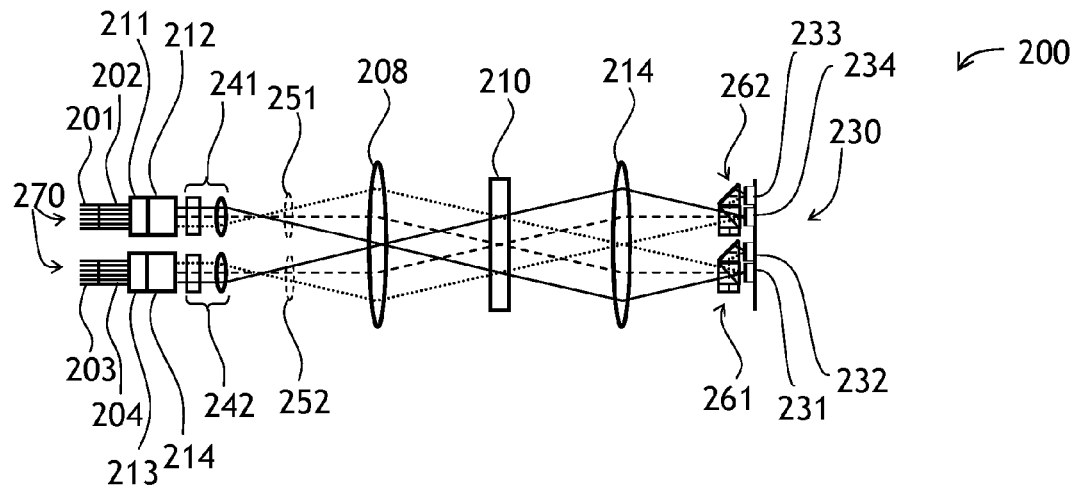
FIGS. 2A and 2B are elevational and plan schematic views, respectively, of a quad WSS of the invention.
Figure 2B:
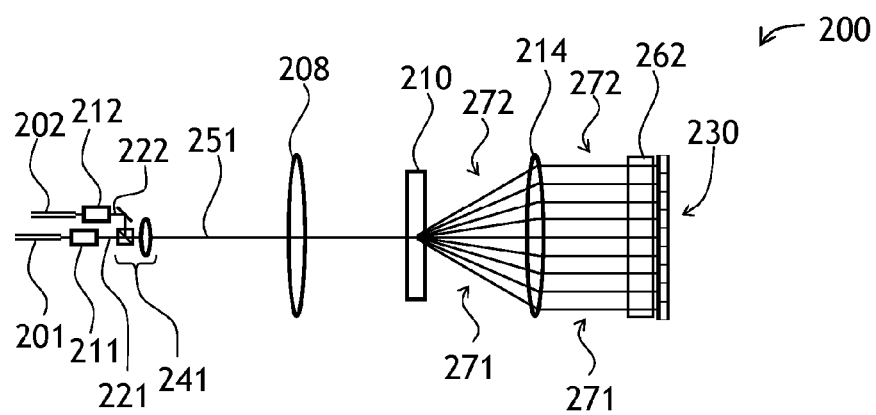

Referring to FIGS. 2A and 2B, a WSS 200 includes a first FAU 201 and a second FAU 202 for launching first 221 and second 222 light beams, respectively, each of the first 221 and second 222 light beams comprising a plurality of wavelength channels. Each FAU 201, 202 includes a plurality of optical fibers 270 for independently switching the wavelength channels between the optical fibers 270 within each FAU 201, 202. Due to the bidirectional character of light propagation through the WSS 200, some of the optical fibers 270 can be dedicated as input optical fibers and some as output optical fibers.

First 211 and second 212 polarizers are optically coupled to the first 201 and second 202 FAUs, respectively, for orthogonally polarizing the first 221 and second 222 light beams emitted by the first 201 and second 202 FAU, respectively. A first beam combiner 241 is optically coupled to the first 211 and second 212 polarizers for combining the orthogonally polarized first 221 and second 222 light beams emitted by the first 201 and second 202 FAU, respectively, into a first combined beam 251. The term "combined beam" does not necessarily mean that the first 221 and second 222 light beams must perfectly overlap on their path. In addition to the completely or partially overlapping beams 221 and 222, the term "combined beam" also includes cases where the first 221 and second 222 light beams co-propagate generally in a same direction.

A collimator 208, e.g. a lens or a concave mirror, is optically coupled to the first beam combiner 241 for collimating the first combined beam 251. A wavelength dispersing element 210 is optically coupled to the collimator 208 for dispersing the first combined beam 241 into a first plurality of wavelength groups 271 (FIG. 2B), each group 271 including one of the wavelength channels from each of the orthogonally polarized first 221 and second 222 light beams. A focusing element 214, e.g. a lens or a concave mirror, is optically coupled to the wavelength dispersing element 210 for focusing the first plurality of wavelength groups 271. Advantageously, the focusing element 214 and the collimator 208 can be different portions of a same concave mirror in a 4f optical configuration.

Figure 4:
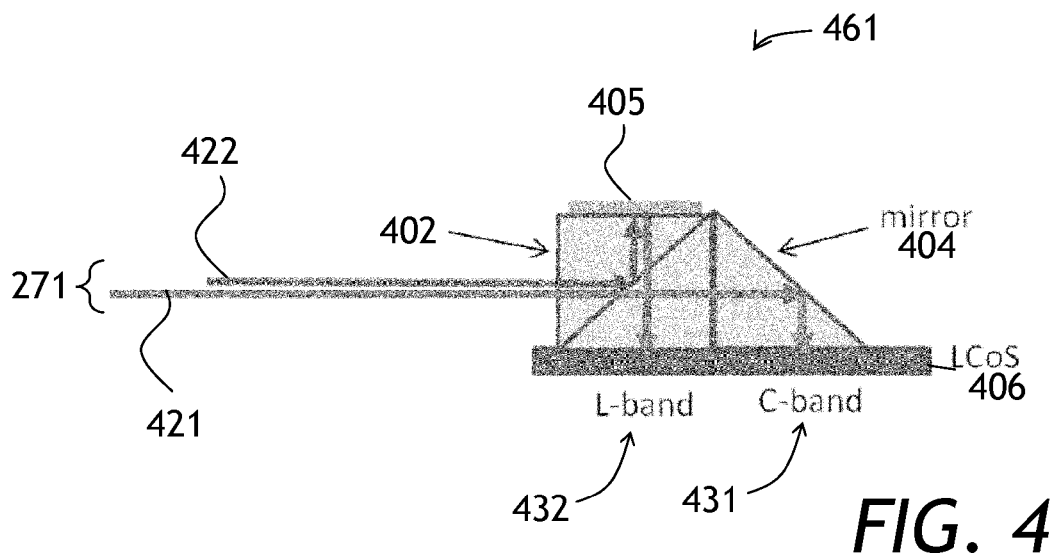
FIG. 4 is an elevational cross-sectional view of a polarizing beamsplitter usable in the WSS of FIGS. 2A and 2B.

A first polarizing beamsplitter 261 is optically coupled to the focusing element 214. Referring momentarily to FIG. 4, an embodiment 461 of the first polarizing beamsplitter 261 can include a polarization beamsplitter cube 402 coupled to a turning mirror 404 for separating each of the focused first plurality of wavelength groups 271 into first 421 and second 422 wavelength channels. Referring back to FIGS. 2A and 2B, the first 421 and second 422 wavelength channels correspond to the first 221 and second 222 orthogonally polarized light beams, respectively.

Still referring to FIGS. 2A and 2B with further reference to FIG. 4, a director array 230 is disposed downstream of the polarizing beamsplitter 261. The director array 230 includes first 231 and second 232 rows of directors for independently redirecting the first 421 and second 422 wavelength channels, respectively (FIG. 4), to propagate back through the first polarizing beamsplitter 261, the focusing element 214, the wavelength dispersing element 210, the collimator 208, the first beam combiner 241, the first 211 and second 212 polarizers, respectively, for independent wavelength-selective coupling into selected optical fibers 270 of the first and 201 second 202 FAUs, respectively.

In the embodiment shown, the WSS 200 also includes optional third 203 and fourth 204 FAUs for launching third and fourth light beams, respectively. The third and fourth light beams are not seen in FIG. 2B, since they are disposed under the first 221 and second 222 light beams, respectively. Each of the third and fourth light beams includes a plurality of wavelength channels. The third 203 and fourth 204 FAUs are disposed under the first 201 and second 202 FAUs, respectively, thus making the WSS 200 a quad WSS including four independently operating WSS units. Each of the third 203 and fourth 204 FAU has a plurality of its own optical fibers 270 for wavelength selective switching of wavelength channels between the optical fibers 270 of each respective FAU 203, 204. Third 213 and fourth 214 polarizers are optically coupled to the third 203 and fourth 204 FAU, respectively, for orthogonally polarizing third and fourth light beams emitted by the third 204 and fourth 204 FAU, respectively.

A second beam combiner 242 is optically coupled to the third 213 and fourth 214 polarizers for combining the orthogonally polarized third and fourth light beams emitted by the third 203 and fourth 204 FAU, respectively, into a second combined beam 252 (FIG. 2A). The collimator 208 is optically coupled to the second beam combiner 242 for collimating the second combined beam 252, so that in operation, the wavelength dispersing element 210 disperses the second combined beam 252 into second plurality of wavelength groups 272 (FIG. 2B), and the focusing element 214 focuses the dispersed second plurality of wavelength groups 272.

A second polarizing beamsplitter 262 is optically coupled to the focusing element for separating each of the focused second plurality of wavelength groups 272 into third and fourth wavelength channels corresponding to the third and fourth orthogonally polarized light beams, respectively. The construction and operation of the second polarizing beamsplitter 262 is similar to the construction and operation of the polarizing beamsplitter embodiment 461 of FIG. 4.

Still referring to FIGS. 2A and 2B, the director array 230 further includes third 233 and fourth 234 rows of directors (FIG. 2A) for independently redirecting the third and fourth wavelength channels, respectively, to propagate back through the second polarizing beamsplitter 262, the focusing element 214, the wavelength dispersing element 210, the collimator 208, the second beam combiner 242, the third 213 and fourth 214 polarizers, respectively, for independent wavelength-selective coupling into selected optical fibers 270 of the third 203 and fourth 204 FAU, respectively. The director array 230 preferably includes an LCoS array, but also can include a liquid crystal (LC) array, a MEMS array of tiltable micromirrors, a digital light processor (DLP), etc.

The number of FAUs in the WSS 200 can vary, depending on the number of individual WSS units required. A two-FAU WSS 200, including only the first 201 and second 202 FAU, can be used as a twin WSS. The number of FAU can also be increased from the four FAU 201 to 204 shown in FIGS. 2A and 2B to six, eight, or more FAUs, by disposing additional FAU under the third 203 and fourth 204 FAU and/or over the first 201 and second 202 FAU, to obtain a WSS module including six, eight, or more WSS units, for as long as optical aberrations and/or height of the WSS 200 remain within acceptable limits.

Figure 3A:
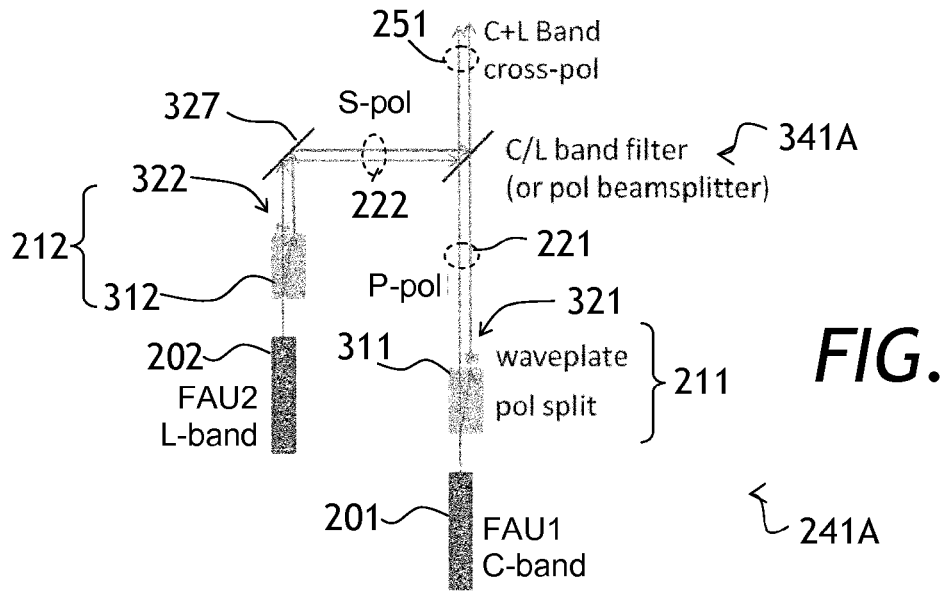
FIGS. 3A and 3B are plan views of two embodiments of a front end usable in the WSS of FIGS. 2A and 2B.
Figure 3B:
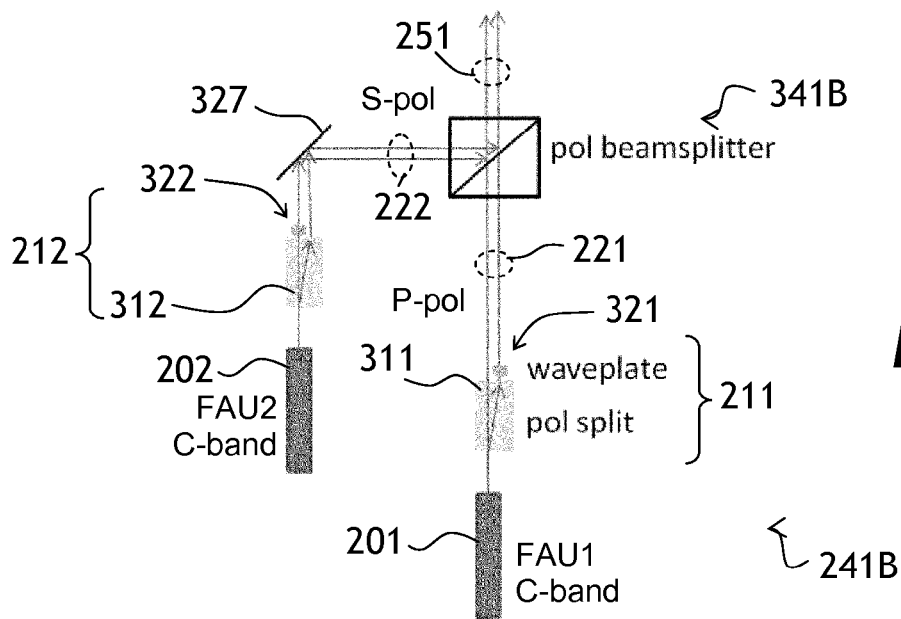

Referring to FIGS. 3A and 3B, wavelength channels of the C-band are coupled to the first FAU 201, and wavelength channels of the L-band are coupled to the second FAU 202. In FIG. 3A, the first polarizer 211 includes a birefringent crystal 311 coupled to the first FAU 201, for splitting the first light beam 221 into two orthogonal polarization components, and a half-wave plate 321 for rotating the state of polarization of one of the two polarization components to match the other polarization component; thus, the first polarizer 211 is nearly 100% effective in p-polarizing the first light beam 221. Similarly, the second polarizer 212 includes a birefringent crystal 312 coupled to the second FAU 202, for splitting the second light beam 222 into two orthogonal polarization components, and a half-wave plate 322 for rotating the state of polarization of one of the two polarization components to match the other polarization component. Thus, the second polarizer 212 is nearly 100% effective in s-polarizing the second light beam 222, which is directed by an optional turning mirror 327 to impinge on the C/L band dichroic beam combiner 341A.

A preferred construction of the first 241 and second 242 beam combiners depends on whether the WSS 200 is constructed for use in a single or multiple communication bands. For example, a beam combiner 241A of FIG. 3A includes a C/L band dichroic beam combiner 341A. The beam combiner 241A can be used when the WSS 200 is constructed to include at least two WSS units, one operating in the C band and one operating in the L band, although a polarization beamsplitter cube can also be used for this purpose. A beam combiner 241B of FIG. 3B can be used when the WSS 200 is constructed to include at least two WSS units operating in a same band e.g. C band or L band. In the beam combiner 241B of FIG. 3B, a polarization beamsplitter cube 341B is used instead of the C/L band dichroic beam combiner 341A of FIG. 3A to combine the first and second light beams 221 and 222, respectively. In FIGS. 3A and 3B, the first 221 and second 222 light beams are orthogonally polarized, because the waveplates 321 and 322 are disposed in different sub-beams exiting the respective birefringent crystals 311 and 312.

Referring again to FIG. 4 with further reference to FIGS. 2A, 2B, and FIG. 3A, the embodiment 461 of the first 261 and second 262 polarizing beamsplitters of the WSS 200 is considered in more detail. In FIG. 4, the polarization beamsplitter cube 402 is coupled, e.g. epoxied or optically contacted, to the prismatic mirror 404. A quarter-wave reflective waveplate 405 is coupled, e.g. epoxied or optically contacted, to a top side of the polarization beamsplitter cube 402, i.e. adjacent a side to which the prismatic mirror 404 is coupled. The quarter-wave reflective waveplate 405 includes a quarter-wave plate coupled to a reflector for reflecting the second wavelength channel 422 to propagate back through the quarter-wave plate, thus making the quarter-wave reflective waveplate 405 operate as a half-wave plate on double pass. In operation, the p-polarized, C-band first wavelength channel 421 propagates through the polarization beamsplitter cube 402 and is turned by the prismatic mirror 404 to impinge onto a LCoS array 406 at a first location 431 including a plurality of pixels for redirecting the first wavelength channel 421 to propagate back for wavelength-selective coupling into the first FAU 201 as explained above. The s-polarized, L-band second wavelength channel 422 is reflected by the polarization beamsplitter cube 402 to double-pass the quarter-wave reflective waveplate 405, which turns the polarization direction of the s-polarized second wavelength channel 422 to become p-polarized, which causes the second wavelength channel 422 to propagate through the polarization beamsplitter cube 402 and impinge onto the LCoS array 406 at an offset second location 432 including a plurality of pixels for redirecting the second wavelength channel 423 to propagate back for wavelength-selective coupling into the second FAU 203. Thus, both the C-band 431 and L-band 432 wavelength channels impinge on the LCoS array 406 at a same state of polarization, that is, p-polarized in this case.

It is noted that the polarizing beamsplitter embodiment 461 also functions as a turning mirror redirecting the dispersed first wavelength groups 271 at 90 degrees. In FIGS. 2A and 2B, the first and second polarizing beamsplitters 261 and 262, respectively, are shown with the first 271 and second 272 wavelength groups passing through without turning by 90 degrees, for simplicity. Both beam turning and beam non-turning embodiments can be used, depending on a desired mounting orientation of the director array 230.

The wavelength dispersing element 210 can include a diffraction grating or a "grism"—a combination of a diffraction grating and a prism. Since the first 251 and second 252 combined optical beams are orthogonally polarized, the diffraction grating or grism 210 must have a practical diffraction efficiency for both orthogonal polarizations, e.g. 50% and higher, preferably 80% and higher, and more preferably 90% and higher. Since the diffraction grating or grism 210 is used in double-pass configuration, a high diffraction efficiency will result in a substantial reduction of optical insertion loss of the WSS 200.

Figure 5A:
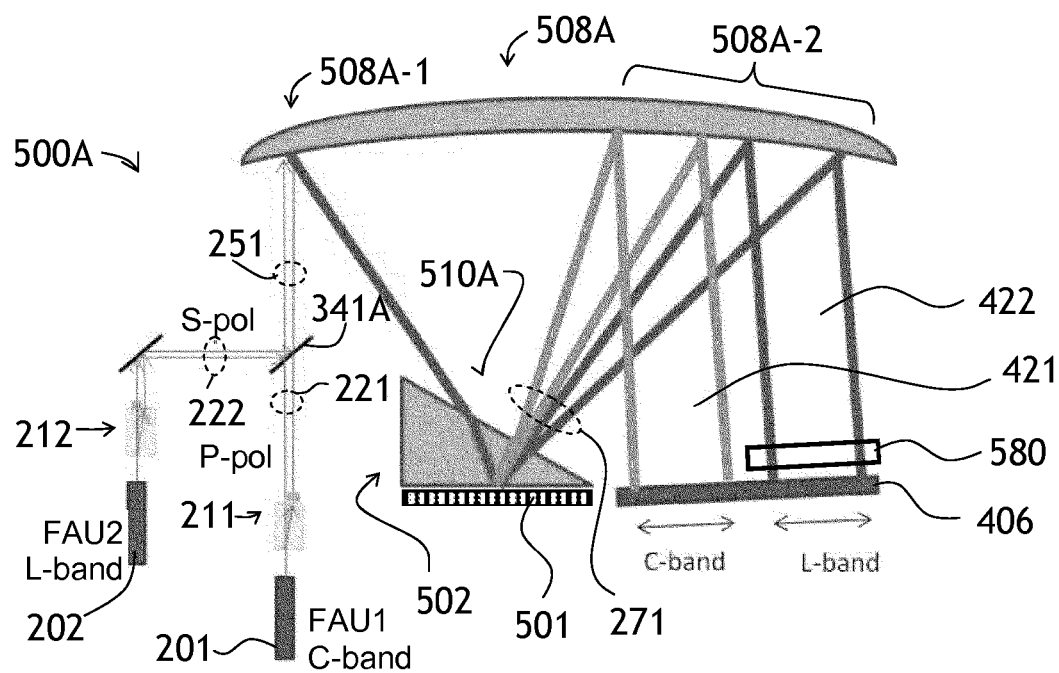
FIG. 5A is a plan schematic view of a C+L band embodiment of the WSS of FIGS. 2A and 2B.

Referring to FIG. 5A, a WSS 500A is a variant of the WSS 200 of FIGS. 2A and 2B. The WSS 500A of FIG. 5A includes the first FAU 201 for wavelength selective switching channels of the C-band, the second FAU 202 for wavelength selective switching channels of the L-band, the first and second polarizers 211 and 212, respectively, and the C/L band dichroic beam combiner 341A for combining the first 221 and second 222 light beams emitted by the first 201 and second 202 FAU, respectively. A single concave mirror 508A collimates the first combined beam 251, directing the first combined beam 251 onto a wavelength dispersing element 510A. The concave mirror 508A also focuses the first wavelength groups 271, directing the first wavelength groups 271 onto the LCoS array 406. A first portion 508A-1 of the concave mirror 508A functions as the collimator 208, and a second portion 508A-2 functions as the focusing element 214 of the WSS 200 of FIGS. 2A, 2B. A half-wave plate 580 rotates the polarization of the second (L-band) wavelength channels 422 to be parallel to the first (C-band) wavelength channels 421, so that the first 421 and second 422 wavelength channels impinge on the LCoS array 406 in a same polarization state.

In the embodiment shown, the wavelength dispersing element 510 includes a diffraction grating 501 coupled to a prism 502; that is, the wavelength dispersing element 510 is a grism. The grism 510 should have high diffraction efficiencies for p-polarized C-band first light beam 221, and for s-polarized L-band second light beam 222. From the practical standpoint, it is preferable that diffraction efficiencies of wavelength channels of C and L communication bands be within 20% of each other, for WSS units of the WSS module 500A to have comparable optical insertion loss.

Figure 5B:
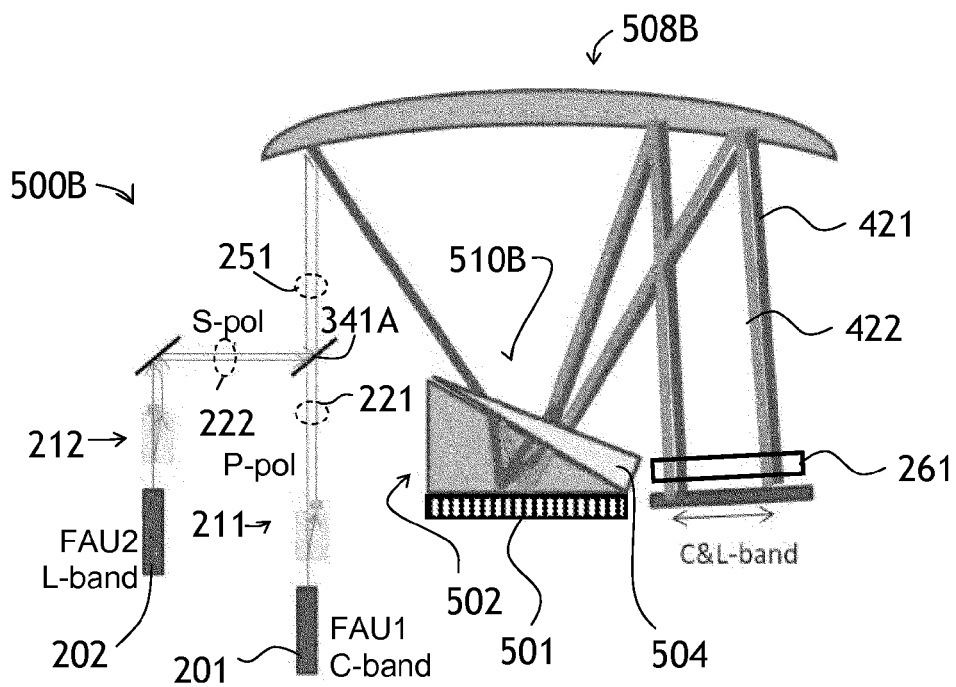
FIG. 5B is a plan schematic view of a C+L band embodiment of the WSS of FIGS. 2A and 2B having a birefringent wedge.

One drawback of the WSS 500A of FIG. 5A is that the first (C-band) wavelength channels 421 and the second (L-band) wavelength channels 422 are directed in a wide non-overlapping cones of directions, increasing the required numerical aperture (NA) of the concave mirror 508A, and consequently increasing optical aberrations. This drawback is mitigated in a WSS 500B of FIG. 5B, which differs from the WSS 500A of FIG. 5A in that a birefringent wedge 504 is optically coupled to the prism 502 and the diffraction grating 501, forming a wavelength dispersing element 510B. The function of the birefringent wedge 504 is to redirect, via polarization-dependent refraction, the first 421 and second 422 orthogonally polarized wavelength channels so that the wavelength channels 421 and 422 of the C and L communication bands, respectively, are dispersed in an overlapping cone of directions, as shown in FIG. 5B. This allows the NA of a concave mirror 508B to be considerably reduced, and associated optical aberrations to be lessened. The first polarizing beamsplitter 261 is used to separate the wavelength channels 421 and 422 as explained above.

Figure 6:
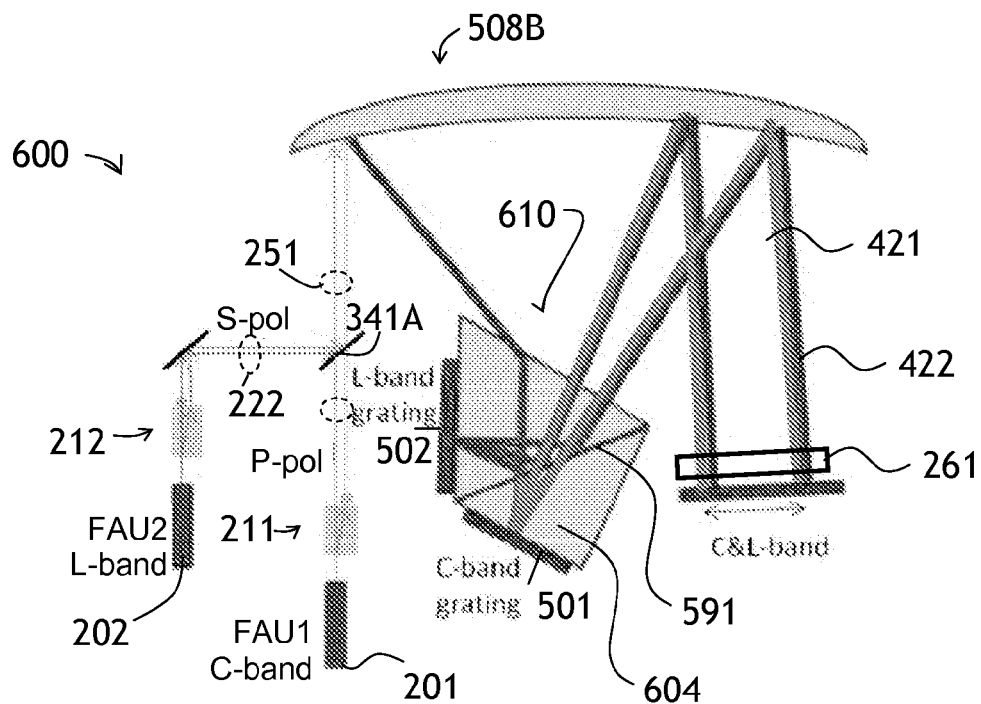
FIG. 6 is a plan schematic view of a C+L band embodiment of the WSS of FIGS. 2A and 2B having a polarizing beamsplitter and a pair of diffraction gratings.

One remaining drawback of the WSS 500B of FIG. 5B is a requirement that the diffraction grating 501 have high diffraction efficiencies in both s and p polarizations, and in both C and L bands. This requirement can be alleviated by constructing a wavelength selective element having two diffraction gratings. Referring to FIG. 6, a WSS 600 includes same elements as the WSS 500B of FIG. 5B, with an exception of a wavelength dispersing element 610, which includes the C-band diffraction grating 501, a separate L-band diffraction grating 502 configured for diffracting wavelength channels of the L band, and a custom-made polarization beamsplitter 604 for separating the first 221 and second 222 light beams to impinge on the first 501 and second 502 diffraction gratings, respectively. The face angles of a polarization beam-splitting face 591, C-band grating 501, and L-band grating 502 of the polarization beam splitter 604 are selected so that wavelength channels of C-band and L-band are dispersed in an overlapping cone of directions as shown in FIG. 6.

In operation, the polarization beam-splitting face 591 splits the first combined beam 251 back into the first 221 and second 222 light beams, which are directed to the corresponding C-band grating 501 and L-band grating 502, which disperses first 221 and second 222 light beams into the first 421 and second 422 wavelength channels, respectively. The first polarizing beamsplitter 261 then combines the first 421 and second 422 wavelength channels to propagate together, in the overlapping cone of directions. This configuration will also work when the first 221 and second light beams 222 include wavelength channels of a single C or L communication band. Herein, the term "overlapping cone of directions" denotes a cone of directions, or diffraction angles, defined by wavelength channels 421 of C-band, at least partially overlapped with a cone of directions, or diffraction angles, defined by wavelength channels 422 of L-band.

The WSS 200 of FIGS. 2A, 2B; the WSS 500A, 500B of FIGS. 5A, 5B, respectively; and the WSS 600 of FIG. 6 use cross-polarized first and second light beams 221 and 222 to double the number of WSS units in a single physical WSS device. A care must be taken to ensure that the polarization states of the first and second light beams 221 and 222 are strictly perpendicular to each other. Any slight rotation in polarization state as the first 221 and second 222 light beams propagate through the optical system will create cross-talk between the first FAU 201 and the second FAU 202. This is detrimental since the Quad WSS 200 must function as 4 independent WSS units, without any significant coupling between channels. The situation is exacerbated when wavelength channels in a same group (e.g. the wavelength group 271 or the wavelength group 272) have same center wavelengths, which could create coherent cross-talk.

To avoid this issue, the first beam combiner 241 can be configured to laterally offset the first 221 and second 222 light beams to propagate adjacent each other, preferably being at least partially overlapped. This can be done in many ways, including offsetting the turning mirrors 327 in FIGS. 3A and 3B, offsetting the first FAU 201, etc. The offset in the paths of the first 221 and second 222 light beams will create a slight lateral offset in the dispersed spectra at the director array 230, which can be accounted for in the calibration of the director array 230, provided that the field of view of the director array 230 is sufficient. In this case, any cross-coupling caused by polarization rotation in the imaging optics e.g. in the collimator 208 and/or the focusing element 214, will not couple into the wrong FAU, but instead will miss the optical fibers 270 by an amount equal to the offset between the cross-polarized paths of the first 221 and second 222 light beams. This will happen because an offset of the first 221 and second 222 light beams will result in angular and/or linear misalignment between a focused beam spot at the "wrong" polarization on tips of the optical fibers 270. For instance, when the second optical beam 222 is offset by shifting the turning mirror 327 upward, the returning second optical beam 222 at the "wrong" p-polarization will be coupled into an optical fiber of the first FAU 201 at an angular offset, which will cause this "wrong" beam to be suppressed upon coupling into the first FAU 201. The second beam combiner 242 can also be configured to slightly separate, or offset, the third and fourth light beams.

Since separate optical amplifiers are most likely used for C and L communication bands, having separate FAUs for the two bands allows direct connection to respective optical amplifiers, without the need for additional C/L band optical filters. However, in some situations, it may be preferable to have wavelength channels of both C and L bands sharing same multiplexed input/output ports. By way of a non-limiting example, express traffic passes through a WSS reconfigurable optical add/drop multiplexor (ROADM) node can include wavelength channels from both communication bands.

Figure 7A:
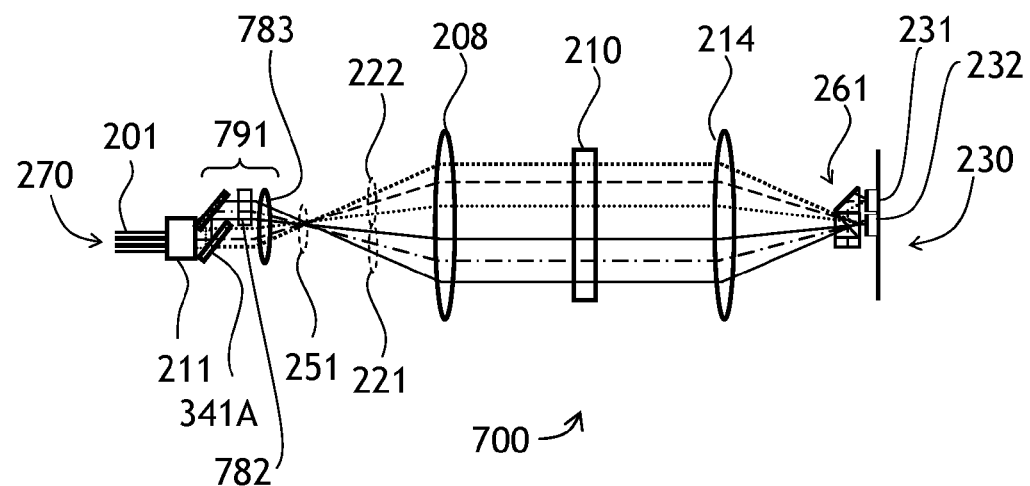
FIGS. 7A and 7B are elevational and plan schematic views, respectively, of a twin WSS of the invention using common ports for C and L band wavelength channels.
Figure 7B:
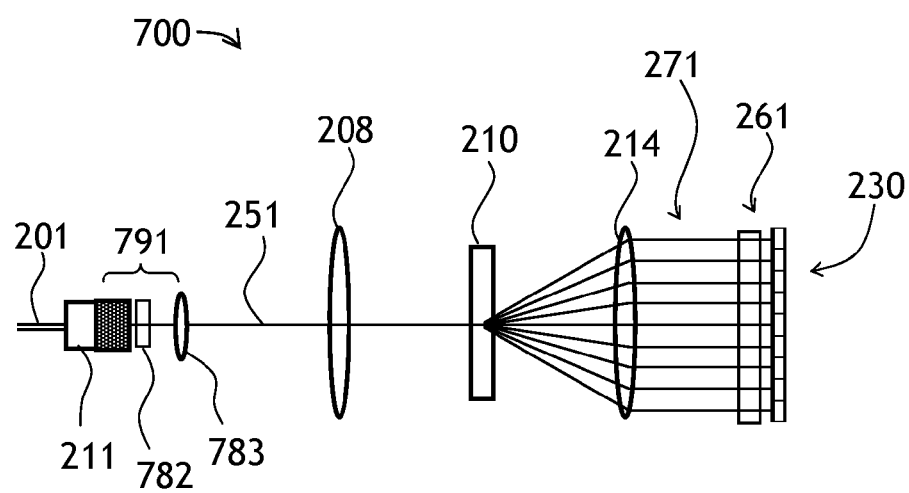

Referring to FIGS. 7A and 7B, a twin WSS 700 is analogous in general construction to the WSS 200 of FIGS. 2A and 2B, differing mostly in front end construction. The twin WSS 700 of FIGS. 7A and 7B includes the first FAU 201 for launching the combined optical beam 251 including the first light beam 221 consisting of a plurality of wavelength channels in the C communication band, and the second light beam 222 consisting of a plurality of wavelength channels in the L communication band. The first FAU 201 includes the plurality of optical fibers 270 for wavelength selective switching wavelength channels between the optical fibers 270.

A first beam launching assembly 791 is optically coupled to the first FAU 201. The first beam launching assembly 791 includes the polarizer 211 for linearly polarizing the first and second light beams, the C/L band dichroic beam combiner 341A optically coupled to the polarizer 211, for splitting the first 221 and second 222 light beams for propagation adjacent each other, and a polarization rotator 782 for rotating the polarization of the second light beam 222, whereby the first 721 and second 722 light beams have orthogonal polarizations while propagating adjacent each other. The first beam launching assembly 791 can also include an angle-to-offset (ATO) lens 783 transforming a lateral displacement of the first 221 and second 222 light beams into angular divergence of these beams. The ATO lens 783 transforms linear offset of the first 221 and second 222 light beams to the left from the ATO lens 783 into angular offset of the first 221 and second 222 light beams to the right the ATO lens 783 in FIGS. 7A and 7B, and angular offset into linear on the way back.

The collimator 208 is optically coupled to the beam launching assembly 791 for collimating the first 221 and second 222 light beams. The wavelength dispersing element 210 is optically coupled to the collimator 208 for dispersing the first 221 and second 222 light beams into a first plurality of wavelength groups 271, each group 271 comprising one of the wavelength channels from each of the orthogonally polarized first 221 and second 222 light beams.

The focusing element 214 is optically coupled to the wavelength dispersing element 210 for focusing the first plurality of wavelength groups 271. The first polarizing beamsplitter 261 is optically coupled to the focusing element 214. The first polarizing beamsplitter 261 is similar to the polarizing beamsplitter embodiment 461 of FIG. 4. Its function is to separate each of the first wavelength groups 271 into the first and second wavelength channels (not shown in FIGS. 7A and 7B) corresponding to the first 221 and second 222 orthogonally polarized light beams, respectively. Thus, the free space optical part including the collimator 208, the wavelength dispersing element 210, and the focusing element 214, is very similar to the free space optical part of the WSS 200 of FIGS. 2A, 2B. The collimator 208 and the focusing element 214 can also be implemented as a single concave mirror, as shown in FIG. 5B and FIG. 6.

As explained above with regards to the WSS 200 of FIGS. 2A and 2B, the wavelength dispersing element 210 can include a birefringent wedge, similar to the wavelength dispersing element 510B of FIG. 5B, or it can include two diffraction gratings coupled to a custom polarization beam splitter, similar to the wavelength dispersing element 510B of FIG. 6.

The director array 230 is disposed downstream of the first polarizing beamsplitter 761. The director array 230 includes first 231 and second 232 rows of directors for independently redirecting the first 421 and second 422 wavelength channels, respectively, to propagate back through the first polarizing beamsplitter 261, the focusing element 214, the wavelength dispersing element 210, the collimator 208, and the first beam launching assembly 791, for independent wavelength-selective coupling into selected optical fibers of the first FAU 201. The director array 230 preferably includes a LCoS array, but also can be a MEMS array of tiltable micromirrors.

Figure 8:
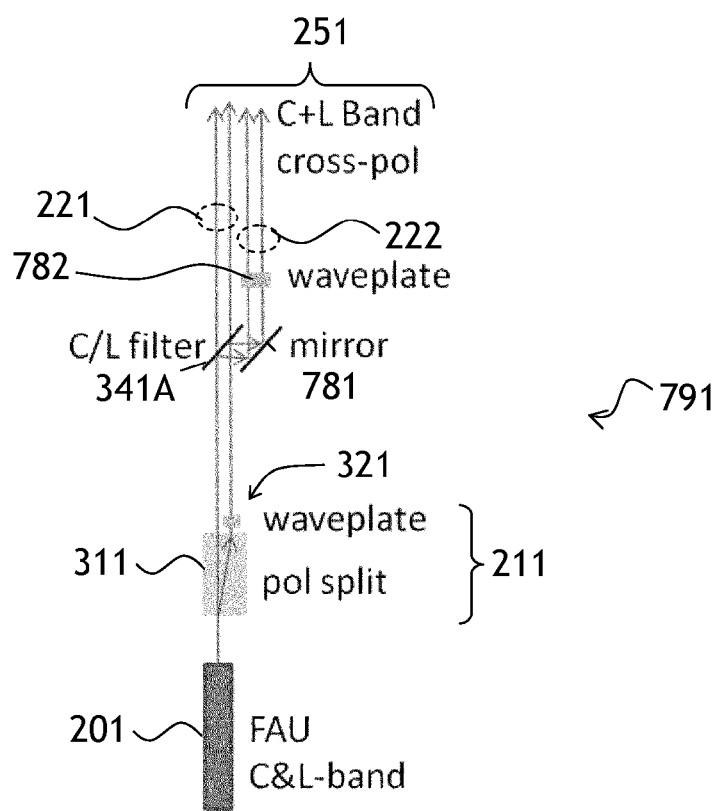
FIG. 8 is an elevational view of a front end usable in the WSS of FIGS. 7A, 7B, and 7C.

The beam launching assembly 791 is specific to the WSS 700 of FIGS. 7A, 7B, and is shown in a greater detail in FIG. 8. The polarizer 211 of the beam launching assembly 791 includes the birefringent crystal 311 coupled to the polarization-turning half-wave plate 321. A turning mirror 781 is coupled to the C/L band dichroic beam combiner 341A, to redirect the second light beam 222 including the L-band wavelength channels to propagate adjacent to the first light beam 721 including C-band wavelength channels. Herein the term "adjacent" refers to the beams 221 and 222 being separated by a distance ranging e.g. from one beam diameter to ten beam diameters. The polarization rotator 782 is preferably a half-wave plate.

Similar principles are applicable to building a twin, a quad, etc. embodiments of WSS 700, in which both C and L band wavelength channels are coupled to a same FAU. A quad embodiment 740 of the WSS 700 will be briefly described with reference to FIG. 7C, which only shows the front and back end portions of the quad WSS 740. A free space portion 788, including the collimator 208, the wavelength dispersing element 210, and the focusing element 214, is identical to that of the WSS 700, and has been omitted in FIG. 7C for brevity. The quad WSS 740 of FIG. 7C includes a second FAU 202 disposed under the first FAU 201. The second FAU 202 launches the combined optical beam 252 including a third light beam 223 having a plurality of wavelength channels in the C communication band, and a fourth light beam 224 including a plurality of wavelength channels in the L communication band. Similarly to the first FAU 201, the second FAU 202 includes a plurality of optical fibers 270, some of which can be designated as input fibers and some as output optical fibers for receiving wavelength channels switched from input fibers independently on each other.

To build the quad WSS 740, a second beam launching assembly 792 is optically coupled to the second FAU 202. The second beam launching assembly 792 is similar to the first beam launching assembly 791 shown in FIG. 8, and is conveniently disposed under the first beam launching assembly 791. The second beam launching assembly 792 includes the polarizer 211 for linearly polarizing the third 223 and fourth 224 light beams, and the C/L band dichroic beam combiner 341A coupled to the polarizer 211, for splitting the third 223 and fourth 224 light beams for propagation adjacent each other while being orthogonally polarized, and the polarization rotator 782 e.g. waveplate, for rotating the polarization of the third 223 and fourth 224 light beams, whereby the third 223 and fourth 224 light beams have orthogonal polarizations. The collimator 708 (FIGS. 7A, 7B) is coupled to the second beam launching assembly for collimating the third 223 and fourth 224 light beams, so that in operation, the wavelength dispersing element 210 disperses the third 223 and fourth 224 light beams into a second plurality of wavelength groups 272, each group including one of the wavelength channels from each of the orthogonally polarized third 223 and fourth 224 light beams, and the focusing element 214 focuses the second plurality of wavelength groups.

A second polarizing beamsplitter 262 is provided in the quad WSS 740, similar to the first polarizing beamsplitter 261 of FIG. 7A and the first polarizing beamsplitter 461 of FIG. 4. The second polarizing beamsplitter 262 is optically coupled to the focusing element 214, for separating each of the second plurality of wavelength groups 272 into third and fourth wavelength channels corresponding to the third 223 and fourth 224 orthogonally polarized light beams, respectively. The director array 230 further includes third 233 and fourth 234 rows of directors for independently redirecting the third 423 and fourth 424 wavelength channels, respectively, to propagate back through the second polarizing beamsplitter 262, the focusing element 214, the wavelength dispersing element 210, the collimator 208, and the second beam launching assembly 792, for independent wavelength-selective coupling into selected optical fibers of the second FAU 202.

Figure 7C:
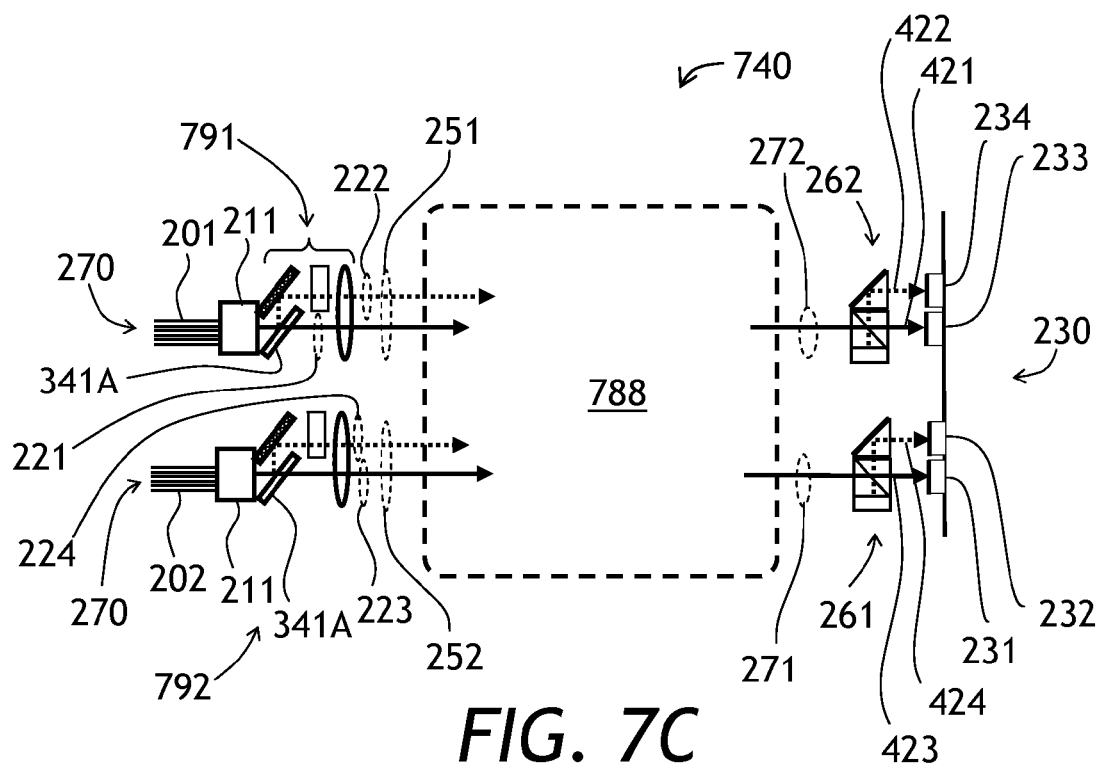
FIG. 7C is an elevational schematic view of quad WSS having the free-space optics of the WSS of FIGS. 7A and 7B.

More FAU can be stacked in the WSS 740 of FIG. 7C and WSS 200 of FIGS. 2A and 2B, to obtain six, eight, and more WSS units in a single package. Accordingly, the director array 230 will have more rows of directors for individual wavelength selective switching of the WSS units.

For simplicity, the polarization diversity front ends of FIGS. 3A, 3B, and FIG. 8 all use laterally offset sub-beams for the two polarization states originating from each FAU. Alternatively, an arrangement can be used which creates an angular offset between the polarization sub-beams, e.g. using Wollaston prisms or the like. The first beam launching assembly 791 and the second beam launching assembly 792 can be is configured to angularly offset the first 221 and second 222 light beams.

The back-end polarization diversity shown in FIG. 4 is applied to independently switch wavelength channels of C and L communication bands. The back-end polarization diversity can also be used in a single WSS for polarization management. This can simplify front end construction, because polarization diversity at front end is not required at this case, thus reducing height of a WSS module. For instance, referring to FIGS. 9A, 9B, and FIG. 10, a single-unit WSS 900 (FIGS. 9A and 9B) includes the first FAU 201 for launching the first light beam 221 including a plurality of wavelength channels 971. The first FAU 201 includes the plurality of optical fibers 270 for wavelength selective switching wavelength channels 971 between the optical fibers 270. In the embodiment shown, the ATO lens 783 transforms lateral offset of beams emitted by the individual optical fibers 270 into an angular offset.

The collimator 208 is coupled to the FAU 901 for collimating the light beam 221. The wavelength dispersing element 210 is coupled to the collimator 208 for dispersing the light beam 221 into the wavelength channels 971. The focusing element 214 is coupled to the wavelength dispersing element 210, for focusing the wavelength channels 971. The first polarizing beamsplitter 261 (FIG. 10) is coupled to the focusing element 214 for separating each of the wavelength channels 971 into first 921 and second 922 polarization sub-beams. The construction of the first polarizing beamsplitter 261 is similar to that of FIG. 4.

Figure 9A:
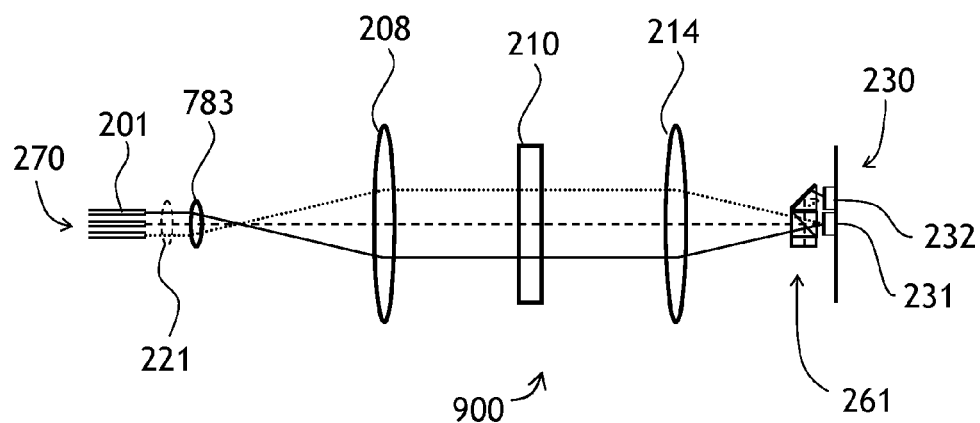
FIGS. 9A and 9B are elevational and plan schematic views, respectively, of a WSS of the invention with independent polarization control.
Figure 9B:
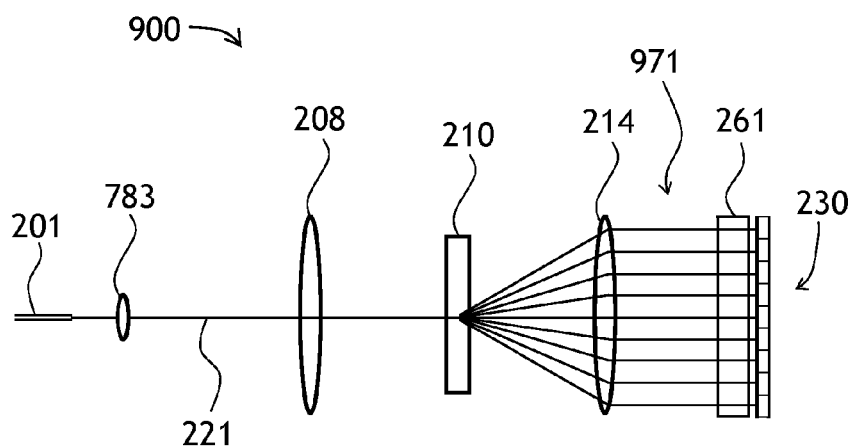
Figure 10:
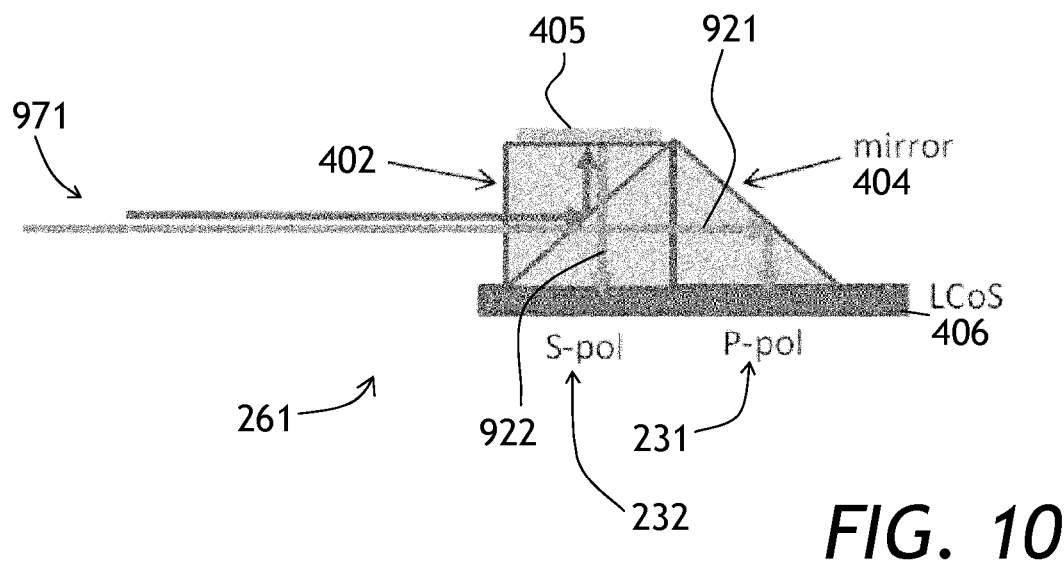
FIG. 10 is an elevational cross-sectional view of a polarizing beamsplitter usable in the WSS of FIGS. 9A and 9B.

Still referring to FIGS. 9A, 9B, and FIG. 10, the director array 230 is coupled to the first polarizing beamsplitter 261. In the embodiment shown, the director array 230 includes the first 231 and second 232 rows of directors for redirecting the first 921 and second 922 sub-beams, respectively, of each of the focused wavelength channels 971, to propagate back through the polarizing beamsplitter 261 for recombination, the focusing element 214, the wavelength dispersing element 210, and the collimator 208, for wavelength-selective coupling both the first 921 and second 922 sub-beams of each wavelength channel 971 into a same selected optical fiber of the FAU 201. Independent control of the first 921 and second 922 polarization sub-beams by the first 231 and second 232 rows of directors, respectively, allows for compensation of a polarization dependent loss (PDL) of optical elements. For example, a diffraction grating embodiment of the wavelength dispersing element 210 can exhibit polarization dependent diffraction efficiency. At a proper PDL calibration of the WSS 300, very low wavelength channel PDL can be achieved. To calibrate out the PDL, one would need to measure wavelength channel loss for both polarizations, and adjust the beam steering by the director array 230 so that the wavelength channel losses for both polarizations are the same, or as close to each other as possible.

Figure 12:
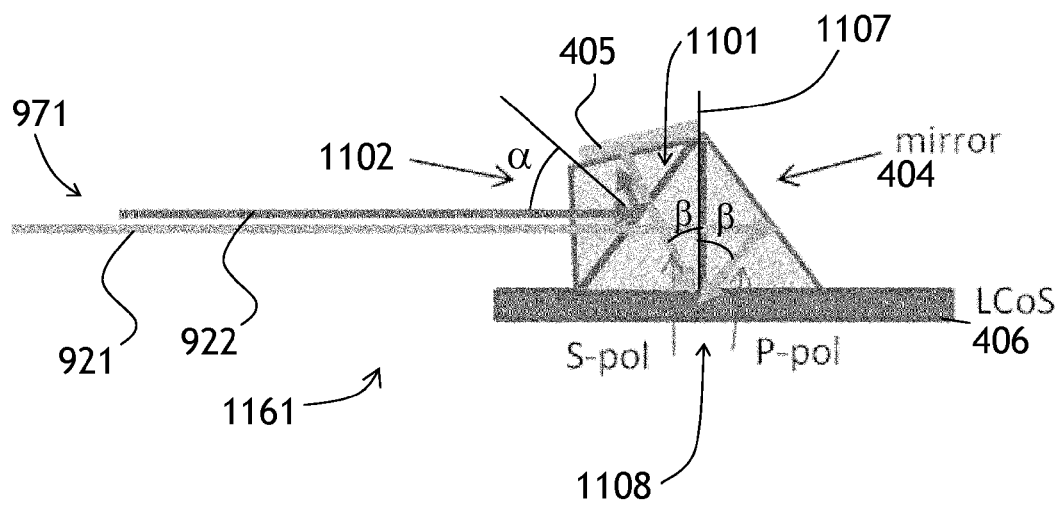
FIG. 12 is an elevational cross-sectional view of a polarizing beamsplitter usable in the WSS of FIGS. 11A and 11B.
Figure 11A:
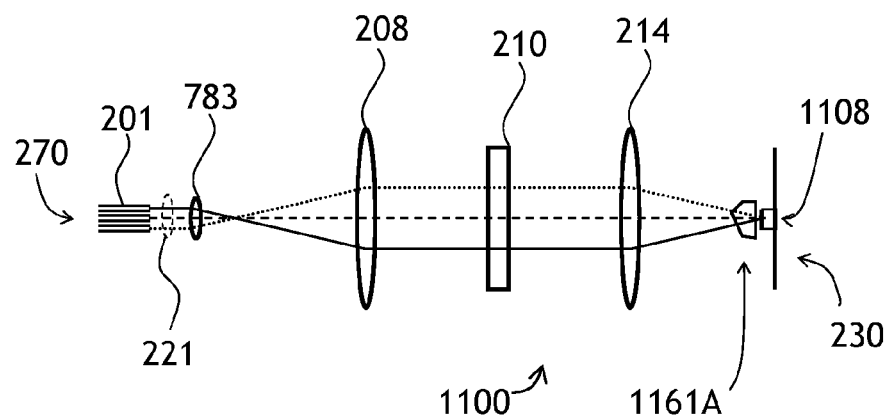
FIGS. 11A and 11B are elevational and plan schematic views, respectively, of a WSS of the invention with polarization diversity at back end.
Figure 11B:
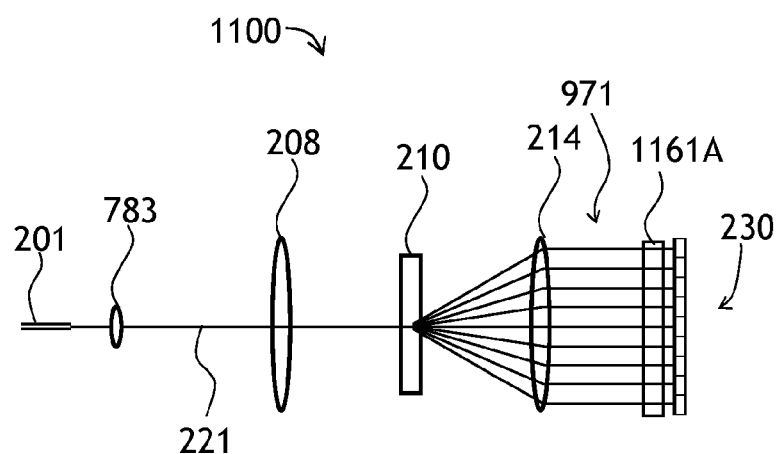

It may be desirable to have the first 921 and second 922 sub-beams of each wavelength channel 971 incident on the same region of the director array 230, to reduce the required size of the director array 230, and to reduce calibration time. To accomplish this, the face angles of the PBS 402 and the prismatic mirror 404 could be angles other than 45 degrees, for example 30 degrees. With an appropriate choice of the prism or turning mirror 404 and PBS 402 angles, the first 921 and second 922 sub-beams can be made to intersect or overlap at the LCOS. For instance, referring to FIGS. 11A, 11B, and FIG. 12, with further reference to FIGS. 9A and 9B, a WSS 1100 (FIGS. 11A and 11B) is similar to the WSS 900 of FIGS. 9A and 9B, the only difference being the construction of a polarizing beamsplitter 1161 (FIG. 12). An angle α of a beam-splitting surface 1101 of a polarization beamsplitter prism 1102 with respect to the first 921 and second 922 sub-beams is away from 45 degrees, so that both the first 921 and the second 922 sub-beams of each wavelength channel 971 are coupled to a same wavelength channel specific location 1108 on the director array 230 at a substantially same angle β, albeit at opposite sides of a normal 1107 to the LCoS array 406. As a result, on an optical path back to the first FAU 201, the first sub-beam 921 propagates back through the polarizing beamsplitter 1161 along a forward path of the second sub-beam 922, and vice versa. Therefore, any optical losses of the first sub-beam 921 on the way back will be equal to the optical losses of the second sub-beam on the way forward, and vice versa. This "polarization diversity" configuration reduces PDL of the entire WSS 1100 for each wavelength channel switched. The WSS 1100 of FIGS. 11A and 11B uses an embodiment 1161A of the polarizing beam splitter 1161 of FIG. 12 that does not turn optical beams by 90 degrees. Either embodiment 1161 or 1161A can be used, depending on desired orientation of the director array (LCoS) 406. Either embodiment 1161 or 1161A includes the non-rectangular polarization beamsplitter prism 1102, having coupled on its adjacent sides the reflective quarter-wave plate 405 and the turning mirror 404.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A wavelength selective switch (WSS) comprising:
an input for launching a first light beam comprising a plurality of wavelength channels and a second light beam, separate from the first light beam, comprising a plurality of wavelength channels;
first and second polarizers, optically coupled to the input, for polarizing the first and second light beams, respectively, to create a first polarized light beam and a second polarized light beam that is orthogonal in polarization to the first polarized light beam;
a beam combiner, optically coupled to the first and second polarizers, for combining the first polarized light beam and the second polarized light beam into a combined beam;
a focusing element, optically coupled to a wavelength dispersing element, for focusing a plurality of wavelength groups associated with the combined beam;
a polarization beamsplitter, optically coupled to the focusing element, for separating each one of the plurality of wavelength groups, based on polarization, into a corresponding first polarized wavelength group and a second polarized wavelength group orthogonal in polarization to the first polarized wavelength group; and
a director array, located downstream from the polarization beamsplitter, including first and second rows of directors for independently redirecting each wavelength channel of the corresponding first polarized wavelength group and second polarized wavelength group of the plurality of wavelength groups, respectively, to propagate back through the polarization beamsplitter, the focusing element, the wavelength dispersing element, the beam combiner, and at least one of the first or second polarizers.

2. The WSS of claim 1, where
the input includes a first input port for launching the first light beam and a second input port for launching the second light beam,
the first light beam including wavelength channels of a C-band, and
the second light beam, including wavelength channels of an L-band.

3. The WSS of claim 1, where
the first polarizer splits the first light beam into two first orthogonal polarization components and rotates a polarization state of one of the first orthogonal polarization components to match a polarization state of the other one of the first orthogonal polarization components, and
the second polarizer splits the second light beam into two second orthogonal polarization components and rotates a polarization state of one of the second orthogonal polarization components to match a polarization state of the other one of the second orthogonal polarization components.

4. The WSS of claim 1, where the wavelength dispersing element disperses the combined beam into the plurality of wavelength groups,
each wavelength group, of the plurality of wavelength groups, including a wavelength channel corresponding to the orthogonally polarized first and second polarized light beams.

5. The WSS of claim 1, where the wavelength dispersing element includes a prism.

6. The WSS of claim 1, where the wavelength dispersing element is optically coupled to a collimator.

7. The WSS of claim 1, where the director array is a programmable phased array.

8. A method comprising:
launching, by an input, a first light beam comprising a plurality of wavelength channels and a second light beam, separate from the first light beam, comprising a plurality of wavelength channels;
polarizing, by first and second polarizers optically coupled to the input, the first and second light beams, respectively, to create a first polarized light beam and a second polarized light beam that is orthogonal in polarization to the first polarized light beam;
combining, by a beam combiner optically coupled to the first and second polarizers, the first polarized light beam and the second polarized light beam into a combined beam;
focusing, by a focusing element optically coupled to a wavelength dispersing element, a plurality of wavelength groups associated with the combined beam;
separating, by a polarization beamsplitter optically coupled to the focusing element, each one of the plurality of wavelength groups, based on polarization, into a corresponding first polarized wavelength group and a second polarized wavelength group orthogonal in polarization to the first polarized wavelength group; and
independently redirecting, by a director array located downstream from the polarization beamsplitter and including first and second rows of directors, each wavelength channel of the corresponding first polarized wavelength group and second polarized wavelength group of the plurality of wavelength groups, respectively, to propagate back through the polarization beamsplitter, the focusing element, the wavelength dispersing element, the beam combiner, and at least one of the first or second polarizers.

9. The method of claim 8, where
the input includes a first input port for launching the first light beam and a second input port for launching the second light beam,
the first light beam including wavelength channels of a C-band, and
the second light beam, including wavelength channels of an L-band.

10. The method of claim 8, further comprising:
splitting, by the first polarizer, the first light beam into two first orthogonal polarization components;
rotating, by the first polarizer, a polarization state of one of the first orthogonal polarization components to match a polarization state of the other one of the first orthogonal polarization components;
splitting, by the second polarizer, the second light beam into two second orthogonal polarization components; and
rotating, by the second polarizer, a polarization state of one of the second orthogonal polarization components to match a polarization state of the other one of the second orthogonal polarization components.

11. The method of claim 8, further comprising:
dispersing, by the wavelength dispersing element, the combined beam into the plurality of wavelength groups,
each wavelength group, of the plurality of wavelength groups, including a wavelength channel corresponding to the orthogonally polarized light beams.

12. The method of claim 8, where the wavelength dispersing element includes a prism.

13. The method of claim 8, where the wavelength dispersing element is optically coupled to a collimator.

14. The method of claim 8, where the director array is a programmable phased array.

15. A wavelength selective switch (WSS) comprising:
an input for launching a first light beam comprising a plurality of wavelength channels and a second light beam, separate from the first light beam, comprising a plurality of wavelength channels;
a wavelength dispersing element for dispersing the plurality of wavelength channels of the first light beam and the plurality of wavelength channels of the second light beam;
a focusing element, optically coupled to the wavelength dispersing element, for focusing the plurality of wavelength channels of the first light beam and the plurality of wavelength channels of the second light beam;
a polarization beamsplitter, optically coupled to the focusing element, for separating the plurality of wavelength channels of the first light beam and the plurality of wavelength channels of the second light beam, dispersed by the wavelength dispersing element and focused by the focusing element, based on polarization, into a first sub-beam and a second sub-beam; and
a director array, optically coupled to the polarization beamsplitter, for redirecting the first sub-beam and the second sub-beam to propagate back through the polarization beamsplitter, the focusing element, and the wavelength dispersing element.

16. The WSS of claim 15, where
the input includes a first input port for launching the first light beam and a second input port for launching the second light beam,
the first light beam including wavelength channels of a C-band, and
the second light beam, including wavelength channels of an L-band.

17. The WSS of claim 15, where
a first polarizer splits the first light beam into two first orthogonal polarization components and rotates a polarization state of one of the first orthogonal polarization components to match a polarization state of the other one of the first orthogonal polarization components, and
a second polarizer splits the second light beam into two second orthogonal polarization components and rotates a polarization state of one of the second orthogonal polarization components to match a polarization state of the other one of the second orthogonal polarization components.

18. The WSS of claim 15, further comprising:
a collimator, optically coupled to the input, for collimating the first light beam.

19. The WSS of claim 15, where the wavelength dispersing element includes a prism.

20. The WSS of claim 15, where the director array is a programmable phased array.

* * * * *